US012719588B2

(12) United States Patent
Jiang et al.

(10) Patent No.: US 12,719,588 B2
(45) Date of Patent: Aug. 25, 2026

(54) ULTRASONIC TRANSCEIVER AND CONTROL METHOD THEREOF

(71) Applicant: Qisda Corporation, Taoyuan City (TW)

(72) Inventors: Fu-Sheng Jiang, Taoyuan City (TW); Pei-Lun Song, Taoyuan City (TW); Yuan-Yu Shih, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 72 days.

(21) Appl. No.: 18/915,536

(22) Filed: Oct. 15, 2024

(65) Prior Publication Data

US 2025/0141567 A1 May 1, 2025

(30) Foreign Application Priority Data

Oct. 30, 2023 (TW) ................................ 112141552

(51) Int. Cl.
*H04B 11/00* (2006.01)

(52) U.S. Cl.
CPC .................................... *H04B 11/00* (2013.01)

(58) Field of Classification Search
CPC ...................................................... H04B 11/00
See application file for complete search history.

(56) References Cited

U.S. PATENT DOCUMENTS

2025/0141567 A1* 5/2025 Jiang ...................... H04B 11/00

FOREIGN PATENT DOCUMENTS

| | | | | |
|---|---|---|---|---|
| CN | 113884116 A | * | 1/2022 | ............. H02M 5/08 |
| CN | 119921874 A | * | 5/2025 | |
| TW | 202230974 A | | 8/2022 | |
| TW | 1880418 B | * | 4/2025 | ............ H04B 11/00 |

OTHER PUBLICATIONS

Translation of CN113884116 (Year: 2022).*
Office action of counterpart application by Taiwan IP Office on Jun. 4, 2024.

* cited by examiner

*Primary Examiner* — Daniel Pihulic

(57) ABSTRACT

An ultrasonic transceiver device and a control method thereof are disclosed. The ultrasonic transceiver device includes a plurality of coupled ultrasonic transceiver units. Each of the ultrasonic transceiver units includes a plurality of ultrasonic oscillators, a driving bias circuit coupled to the ultrasonic oscillators and used to receive an alternating current (AC) voltage, and a switching circuit coupled to the driving bias circuit. The switching circuit has a plurality of switching paths corresponding to a plurality of impedance values or a plurality of inductance values. The switching circuit is used to switch a system driving signal to pass through one of the switching paths according to a mode selection signal and transmitted to the driving bias circuit as the AC voltage.

17 Claims, 6 Drawing Sheets

ULTRASONIC TRANSCEIVER AND CONTROL METHOD THEREOF

This application claims the benefit of Taiwan application Serial No. 112141552, filed Oct. 30, 2023, the subject matter of which is incorporated herein by reference.

BACKGROUND OF THE INVENTION

Field of the Invention

The invention relates in general to an ultrasonic transceiver device and a control method thereof.

Description of the Related Art

Capacitive micromachined ultrasonic transducer (CMUT) is an ultrasonic transducer manufactured using the micro-electromechanical systems (MEMS) technology. CMUT is formed of miniature parallel capacitor plates. When receiving a voltage, the capacitor plates vibrate, then emit and receive ultrasonic waves. Due to the film vibration characteristics of the resonant cavity, CMUT is also referred as ultrasonic oscillator.

Compared with conventional piezoelectric ultrasonic transducer (PZT), CMUT has the following advantages. (1) Larger bandwidth: CMUT normally has larger bandwidth, and therefore provides higher resolution in medical imaging, substance testing and other applications. (2) Better integrability: CMUT is manufactured using the MEMS technology, and therefore can be more easily integrated on the same chip with other electronic elements (such as amplifiers and filters). (3) Smaller size: the size of CMUT can be very small, and this is an important advantage in the application where small-sized transducer (such as endoscope) is needed. (4) Higher flexibility: the design of CMUT can have various shapes and sizes, and therefore can be adapted to the requirements of various application scenarios. (5) Lower production cost: CMUT is manufactured using the standard semi-conductor manufacturing technology, and therefore possesses potential cost advantage.

CMUT has now been widely used in fields such as medical ultrasonic imaging and non-destructive testing. With outstanding characteristics and performance, CMUT has gradually attracted more and more attention, and the application field is getting wider and wider.

CMUT can be used to form ultrasonic imaging with which the soft tissues and structure of a human body can be seen. When ultrasonic pulses are emitted to the inside of tissues, sound waves with different amplitudes can be reflected to the detector. The reflected sound waves can be recorded and converted into images. The intensity (amplitude) of ultrasonic waves and the time for the ultrasonic waves to pass through the human body can be used to generate an ultrasonic image. For instance, the image can show a two-dimensional cross-section of tissues, blood flowing, existence of particular molecules, hardness of tissues, or the anatomy of a three-dimensional area.

However, existing ultrasonic transceiver devices formed of CMUT have low color sensitivity, therefore the signal-to-noise ratio (SNR) is poor. Besides, existing ultrasonic transceiver devices formed of CMUT also have low resolution.

Therefore, it has become a prominent task for the industries to provide an ultrasonic transceiver device formed of CMUT capable of resolving the problems encountered in the prior art.

SUMMARY OF THE INVENTION

According to one embodiment of the present invention, an ultrasonic transceiver device is disclosed. The ultrasonic transceiver device includes a plurality of coupled ultrasonic transceiver units. Each of the ultrasonic transceiver units includes: a plurality of ultrasonic oscillators; a driving bias circuit coupled to the ultrasonic oscillators and used to selectively output an alternating current (AC) voltage and a direct current (DC) voltage to the ultrasonic oscillators; and a switching circuit coupled to the driving bias circuit, wherein the switching circuit has a plurality of switching paths corresponding to a plurality of impedance values or a plurality of inductance values, and the switching circuit is used to switch a system driving signal to pass through one of the switching paths according to a mode selection signal and transmitted to the driving bias circuit.

According to another embodiment of the present invention, an ultrasonic transceiver device controlling method is disclosed. The control method is used for controlling the said ultrasonic transceiver device. The control method includes: during emission of ultrasonic waves, emitting the mode selection signal to transmit the system driving signal to the driving bias circuit through one of the switching paths, and the driving bias circuit drives the ultrasonic oscillators to emit ultrasonic waves.

According to an alternate embodiment of the present invention, an ultrasonic transceiver device is disclosed. The ultrasonic transceiver device includes a plurality of coupled ultrasonic transceiver units. Each of the ultrasonic transceiver units includes: a plurality of ultrasonic oscillators; a driving bias circuit coupled to the ultrasonic oscillators and used to receive an alternating current (AC) voltage; and a switching circuit coupled to the driving bias circuit, wherein the switching circuit has a plurality of switching paths corresponding to a plurality of impedance values or a plurality of inductance values; the switching circuit is used to switch a system driving signal to pass through one of the switching paths according to a mode selection signal and transmitted to the driving bias circuit as the AC voltage.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
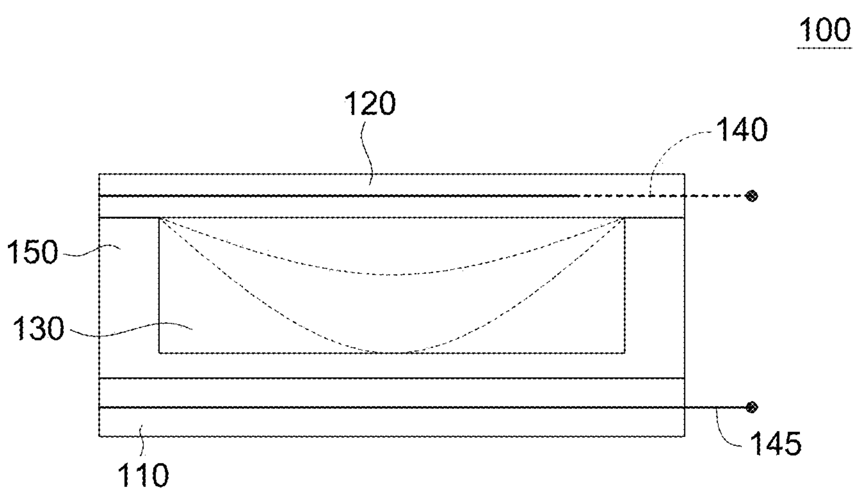
FIG. 1 illustrates a schematic diagram of an ultrasonic oscillator according to an embodiment of the invention.

FIG. 1 illustrates a schematic diagram of an ultrasonic oscillator according to an embodiment of the invention. Exemplarily but not restrictively, the ultrasonic oscillator according to an embodiment of the invention can be realized by a capacitive micromachined ultrasonic transducer (CMUT) or an ultrasonic oscillator. The ultrasonic oscillator 100 according to an embodiment of the invention includes a substrate 110, a membrane 120, a cavity 130, an upper electrode 140, a lower electrode 145 and an insulating layer 150.

The substrate 110 is normally manufactured of glass or silicon or other semi-conductor materials, and can be used as a foundational structure of a CMUT.

The membrane 120 is normally manufactured of silicon or other similar materials and metal electrodes. The membrane 120 is a movable part of the CMUT that is used to generate and receive ultrasonic waves. The membrane 120 is formed of a thin semi-conductor or a metal film or an insulating layer.

The cavity 130 is located in the space between the membrane 120 and the substrate 110 and forms a capacitor. The cavity 130 is normally in a vacuum state or is filled with air.

The upper electrode 140 is located on the membrane 120, and the lower electrode 145 is located on the substrate 110. The upper electrode 140 receives a DC voltage or an AC voltage. The lower electrode 145 is such as grounded.

The insulating layer 150 provides insulation and avoids the membrane 120 and the lower electrode 145 having an electrical contact directly. The insulating layer 150 can avoid short-circuiting and damage, particularly when the device is driven by a high voltage.

Details of the operation principles of the CMUT are as follows.

Emission of ultrasonic waves: when an AC voltage or a DC voltage is applied between two electrodes (140 and 145), the membrane 120 will generate vibrations due to electrostatic attraction and capacitance change. Such vibrations will generate pressure waves then form ultrasonic waves.

Reception of ultrasonic waves: when ultrasonic waves hit the membrane 120, the membrane 120 will generate tiny vibrations. Such vibrations will change the capacitance of the cavity 130 then generate voltage change between the electrodes.

As for how to use the ultrasonic oscillator 100 (CMUT) to receive and transmit ultrasonic waves to form images, basic descriptions are disclosed below.

During the emission of ultrasonic waves, when an AC voltage is applied to the upper electrode of the CMUT, the distance between the membrane 120 and the lower electrode 145 opposite to the membrane 120 will change. Due to the motion of the membrane 120, the surrounding media (such as water or biological tissues) will be affected by pressure waves. The pressure waves will spread in the form of ultrasonic waves.

During the reception of ultrasonic waves, when the ultrasonic waves emitted from the CMUT hit a material interface, which has different intensities or is elastic, wave reflection will be generated. When the waves are reflected back to the CMUT, the reflected waves will cause oscillation to the membrane 120 and make the membrane 120 deformed. The deformation of the membrane 120 will change the voltage of the CMUT. Such voltage change can be converted into electrical signals.

During the formation of images, useful information are extracted from the collected electrical signals of the CMUT using signal processing algorithms. Then, the electrical signals are converted into ultrasonic images using mathematical algorithms.

Figure 2:
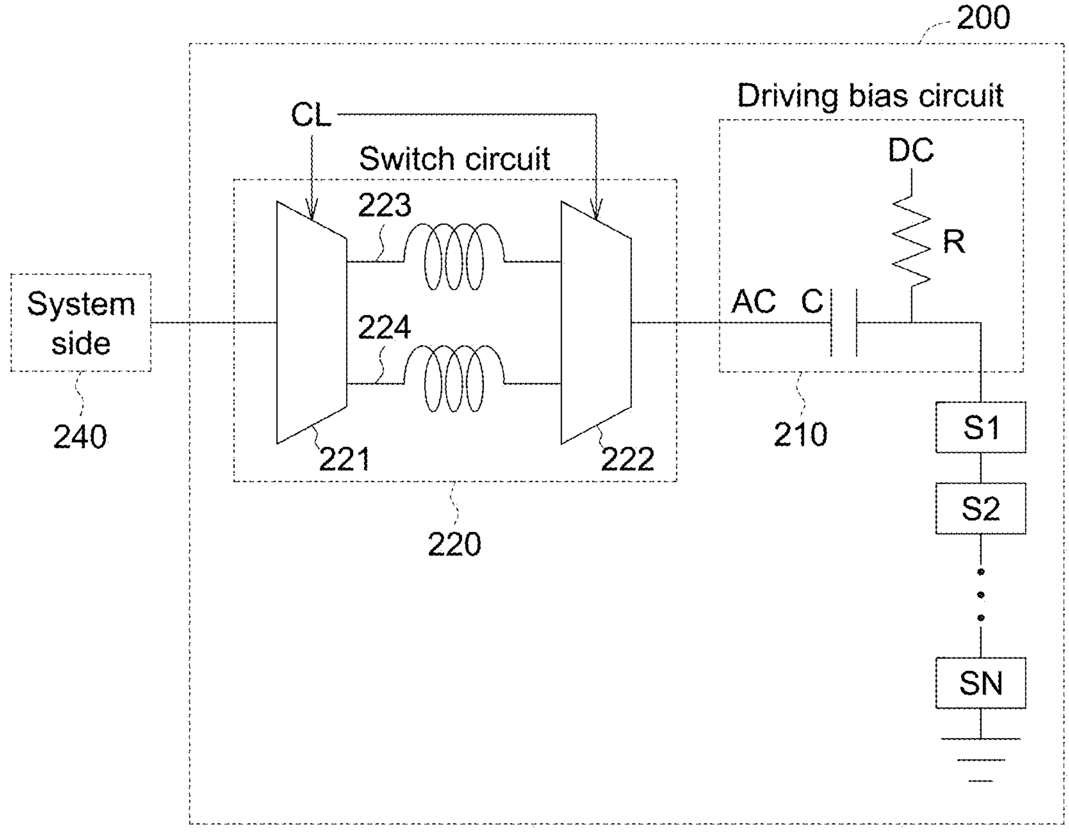
FIG. 2 illustrates a schematic diagram of an ultrasonic transceiver unit according to an embodiment of the invention.

FIG. 2 illustrates a schematic diagram of an ultrasonic transceiver unit according to an embodiment of the invention. The ultrasonic transceiver unit 200 according to an embodiment of the invention includes one or more ultrasonic oscillators S1-SN (N is a positive integer), a driving bias circuit 210, and a switching circuit 220.

The ultrasonic oscillators S1-SN are connected in series or parallel. The present invention is not subjected to the said arrangement of coupling, and other arrangements of coupling are also within the spirit and scope of protection of the present invention.

The driving bias circuit 210 is coupled to the ultrasonic oscillators S1-SN. The driving bias circuit 210 is used to selectively output an AC voltage AC and a DC voltage DC to the upper electrode 140 of the ultrasonic oscillators S1-SN. The driving bias circuit 210 includes a capacitor C and a resistor R. The capacitor C is coupled between the switching circuit 220 and the ultrasonic oscillators S1-SN. The resistor R is coupled between the DC voltage source and the ultrasonic oscillators S1-SN. The DC voltage source provides a DC voltage DC to the ultrasonic oscillators S1-SN.

The switching circuit 220 is coupled to the driving bias circuit 210. The switching circuit 220 has a plurality of switching paths corresponding to a plurality of impedance values or inductance values. Exemplarily but not restrictively, the switching circuit 220 includes a plurality of multiplexers and a plurality of inductor. Although it is exemplified that the switching circuit 220 includes two multiplexers 221 and 222 and two inductors 223 and 224, the present invention is not limited thereto. The multiplexers 221 and 222 together with the inductor 223 form a first switching path; the multiplexers 221 and 222 together with the inductor 224 form a second switching path. In other embodiments, the elements 223 and 224 can be realized by resistors having 0Ω, and such arrangement is still within the spirit and scope of protection of the present invention.

The switching circuit 220 receives voltage signals from the system side 240 (including but not limited to a computer host). Under the control of the mode selection signal CL, the multiplexers 221 and 222 perform switching to match with different inductors or impedances.

The inductors 223 and 224 have different inductance values. Exemplarily but not restrictively, the inductance or impedance values of the inductors 223 and 224 are respectively equivalent to 0Ω (equivalent to a direct route) and 4.7 μH.

For an ultrasonic oscillator to operate in the color mode (also referred as the first mode), the multiplexers 221 and 222 are controlled by the mode selection signal CL, so that the driving signal transmitted from the system side 240 (also referred as system driving signal) is used as the AC voltage AC which passes through the first switching path (including the inductor 223 (0Ω)) then is transmitted to the driving bias circuit 210.

Conversely, for an ultrasonic oscillator to operate in the brightness mode (B mode) (also referred as the second mode), the multiplexers 221 and 222 are controlled by the mode selection signal CL, so that the driving signal transmitted from the system side 240 is used as the AC voltage AC which passes through the second switching path (including the inductor 224 (4.7 μH)) then is transmitted to the driving bias circuit 210. When the system driving signal is transmitted to the driving bias circuit 210 through the first switching path or the second switching path, the driving bias circuit 210 drives the ultrasonic oscillators S1-SN to emit ultrasonic waves.

Figure 3:
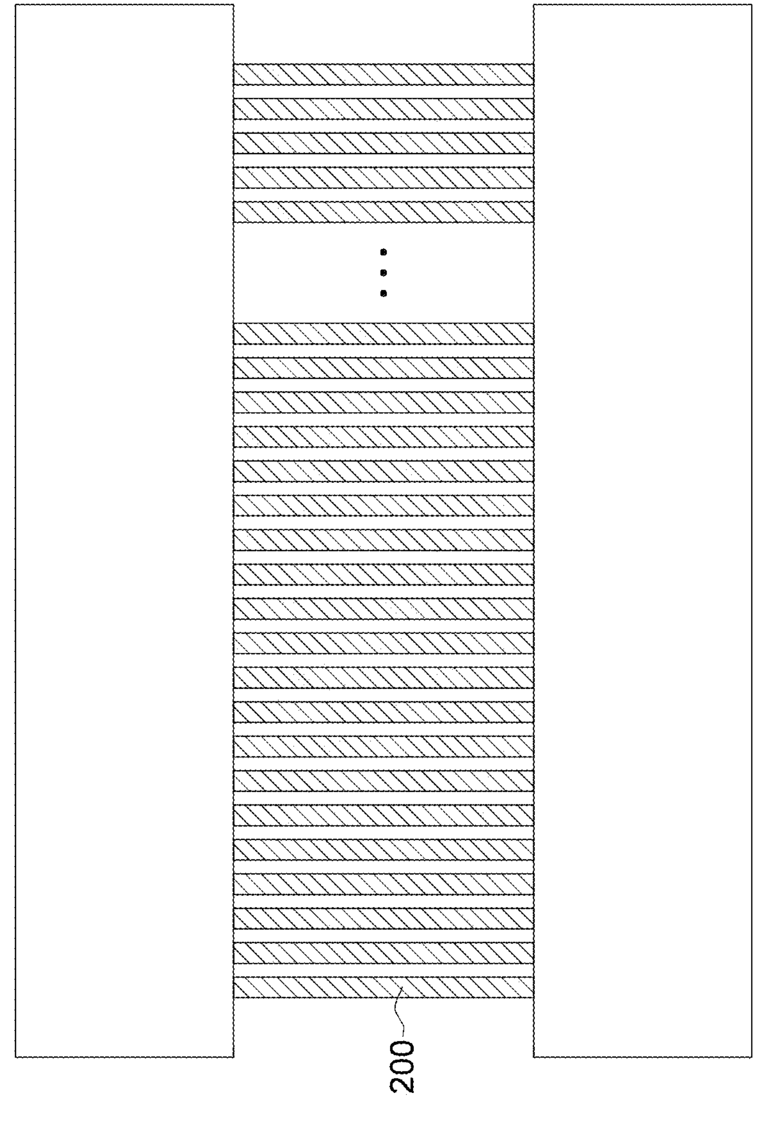
FIG. 3 illustrates a schematic diagram of an ultrasonic transceiver device according to an embodiment of the invention.
Figure 4A:
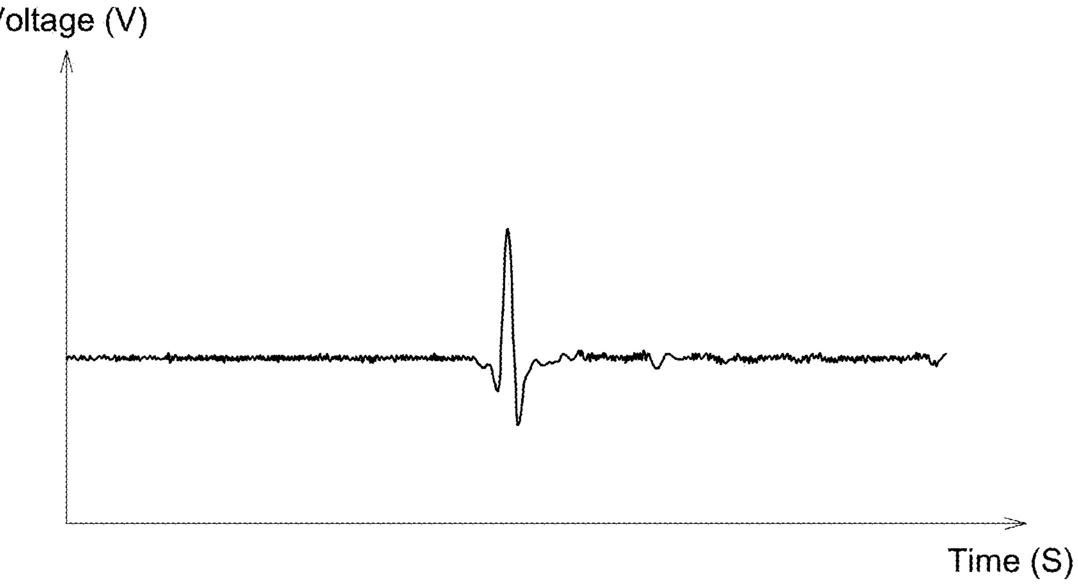
FIGS. 4A~4D illustrate pulse-echo waveform diagrams of an ultrasonic oscillator according to an embodiment of the invention.
Figure 4B:
Figure 4C:
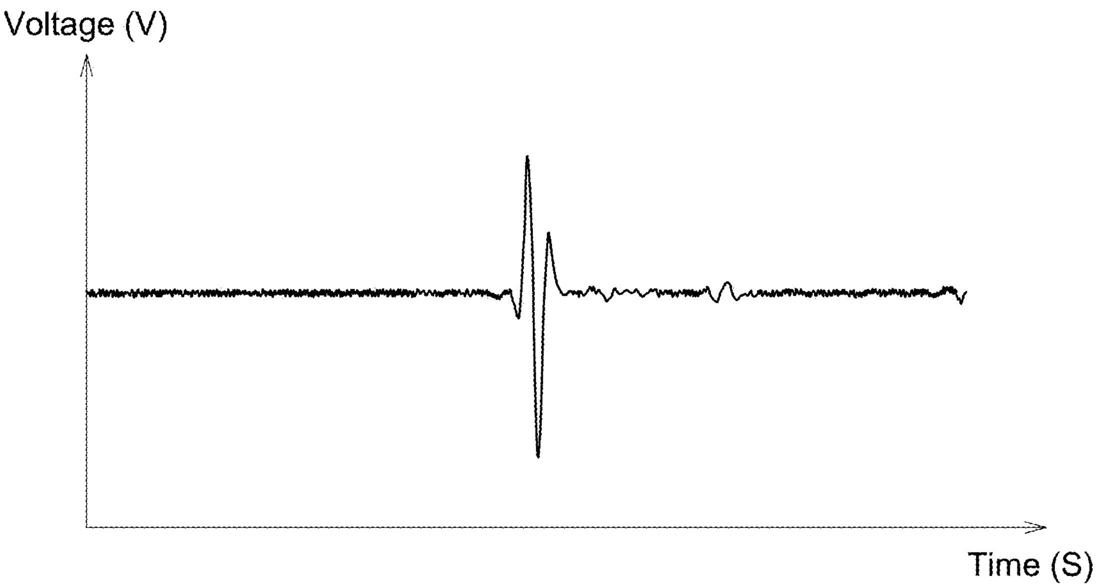
Figure 4D:
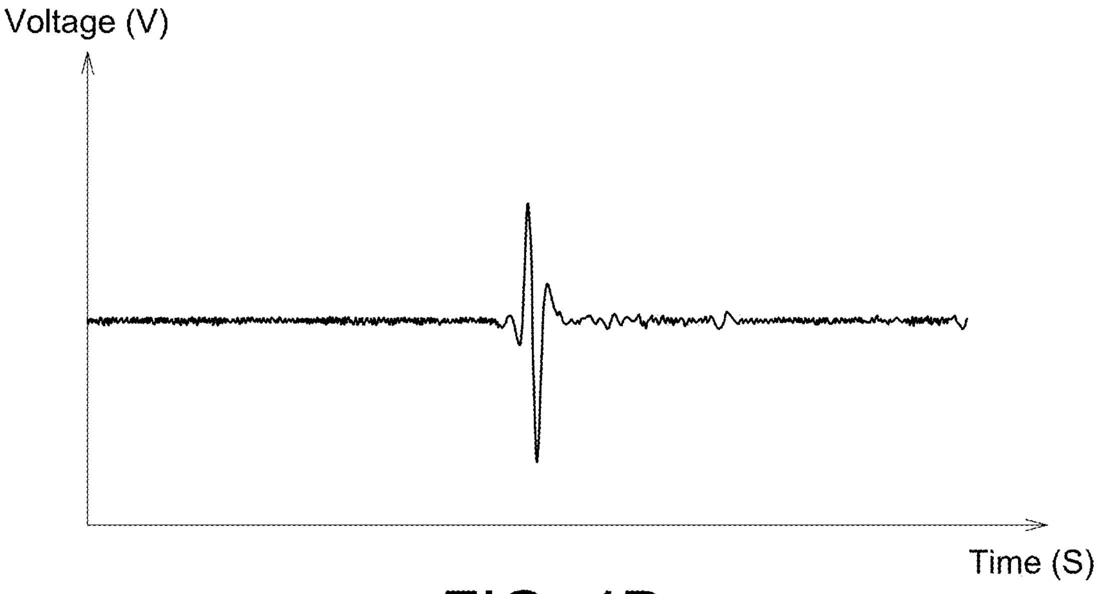

FIG. 3 illustrates a schematic diagram of an ultrasonic transceiver device according to an embodiment of the invention. The ultrasonic transceiver device 300 according to an embodiment of the invention includes a plurality of ultrasonic transceiver units 200, wherein, the ultrasonic transceiver units 200 are connected in parallel.

FIGS. 4A~4D illustrate pulse-echo waveform diagrams of an ultrasonic oscillator according to an embodiment of the invention. In an embodiment of the invention, by changing the DC voltage DC applied to the ultrasonic oscillator 100, the waveform of the ultrasonic oscillator 100 can be changed. In FIGS. 4A~4D, the horizontal axis represents time, and the vertical axis represents the electrical signal of pulse-echo waveforms (the unit is voltage). Or, FIGS. 4A~4D illustrate electrical signals converted from the received pulse-echo waveforms.

In FIGS. 4A~4D, the DC voltages DC applied to the ultrasonic oscillator 100 respectively are 155V, 166V, 177V, and 200V. When the DC voltage DC applied to the ultrasonic oscillator 100 is 155V, the membrane 120 will collapse and will contact the cavity 130.

Figure 5A:
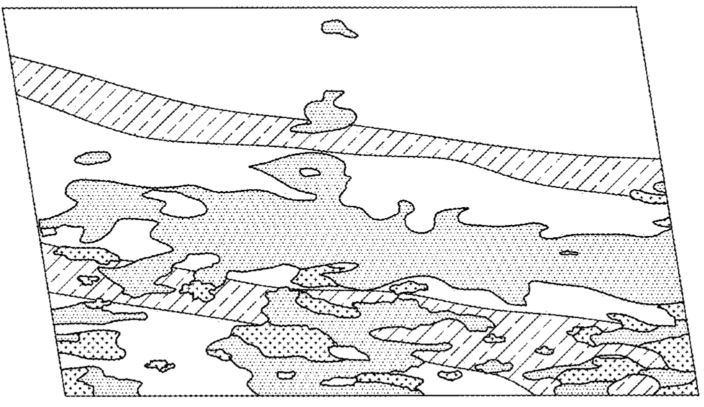
FIG. 5A illustrates a pulse-echo waveform diagram of a conventional ultrasonic oscillator in the form of positive pulses.
Figure 5B:
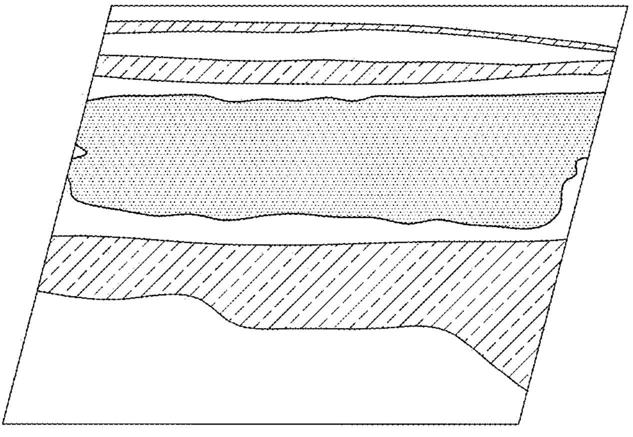
FIG. 5B illustrates a pulse-echo waveform diagram of an ultrasonic oscillator in the form of positive and negative pulses according to an embodiment of the invention.

FIG. 5A illustrates a pulse-echo waveform diagram of a conventional ultrasonic oscillator in the form of positive pulses. FIG. 5B illustrates a pulse-echo waveform of an ultrasonic oscillator 100 in the form of positive and negative pulses according to an embodiment of the invention. FIG. 5A and FIG. 5B illustrate blood flow images obtained from ultrasonic waves through conversion. Or, FIG. 5A to FIG. 5B illustrate the images of pulse-echo waveforms obtained through conversion.

In FIG. 5A, when the pulse-echo waveforms of the conventional ultrasonic oscillator have positive pulses, color sensitivity is low, and the signal-to-noise ratio (SNR) is poor.

In an embodiment of the invention, as indicated in FIG. 5B, by changing the DC voltage, the pulse-echo waveforms of the ultrasonic oscillator 100 according to an embodiment of the invention have positive and negative pulses, color sensitivity is high, so that the quality of blood flow images under the color mode can be improved.

Figure 6A:
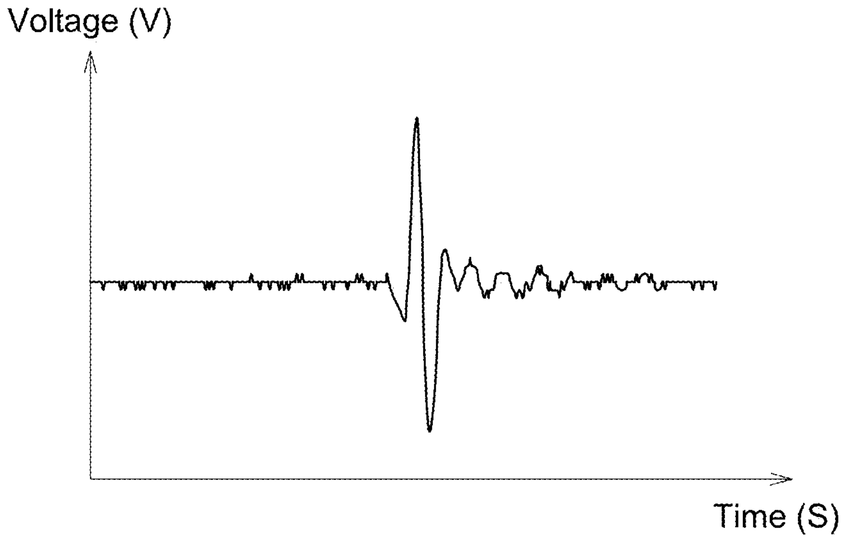
FIG. 6A illustrates a positive and negative pulse-echo waveform diagram of an ultrasonic oscillator operating in a color mode according to an embodiment of the invention.
Figure 6B:
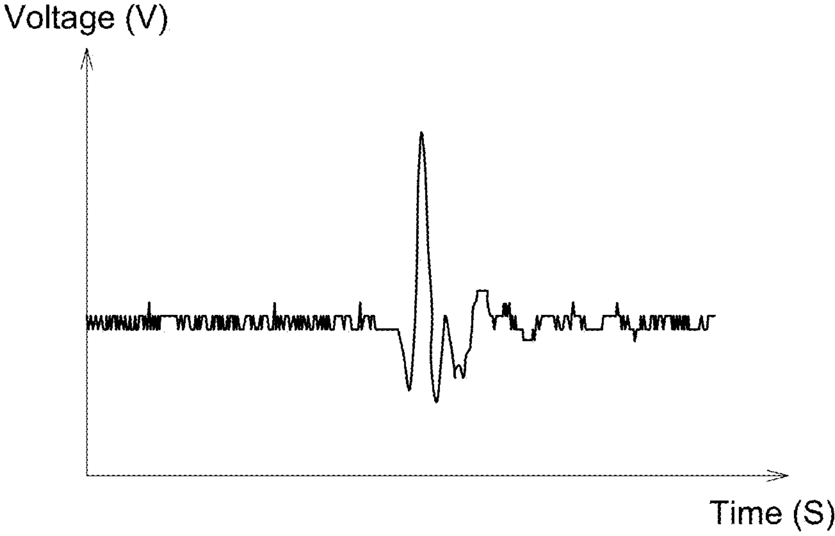
FIG. 6B illustrates a positive and negative pulse-echo waveform diagram of an ultrasonic oscillator operating in a brightness mode according to an embodiment of the invention.

FIG. 6A illustrates positive and negative pulse-echo waveforms of an ultrasonic oscillator operating in a color mode (such as the positive and negative pulse-echo waveforms when the signal passing through the inductor 223 (0Ω)) according to an embodiment of the invention. FIG. 6B illustrates positive and negative pulse-echo waveforms of an ultrasonic oscillator operating in a brightness mode (such as the positive and negative pulse-echo waveforms when the signal passing through the inductor 224 (4.7 μH)) according to an embodiment of the invention. Or, FIG. 6A to FIG. 6B illustrate conversion of the electrical signals of received pulse-echo waveforms.

In an embodiment of the invention, after "impedance matching", regardless the ultrasonic oscillator 100 according to an embodiment of the invention operates in a brightness mode or a color mode, the pulse-echo waveforms have positive and negative pulse-echo waveforms.

That is, like FIG. 5B, after "impedance matching", regardless the ultrasonic oscillator 100 according to an embodiment of the invention operates in a brightness mode or a color mode, the ultrasonic oscillator 100 have high color sensitivity and the imaging quality are improved.

In an embodiment of the invention, since the ultrasonic oscillator 100 needs to be driven by a DC voltage or an AC voltage, through impedance matching, pulse-echo waveforms can be changed. Therefore, the ultrasonic oscillator 100 according to an embodiment of the invention can generate high-resolution images and suitable color intensities for blood flow in response to different purposes of imaging (such as brightness mode and color mode).

Although several specific details are described in the present application, these specific details should not be interpreted as restrictions of the scope of protection of the claims; rather, they should be regarded as descriptions of the features of specific implementations. In the application, a sub-combination of some features described in the context of a single embodiment can be implemented in one single embodiment. Conversely, various features described in the context of one single embodiment can be implemented in one or a suitable sub-combination of several embodiments. Initially, the descriptions may suggest that some features would function only when they are included in some combinations, and such combinations may even be specified. However, under some circumstances, one or some features can be deleted from the said combinations, which are related to one specific sub-combination or variations thereof. Similarly, although the operations of the method are illustrated in a specific order, it does not mean that these operations must be executed according to the illustrated order or that all illustrated operations must be executed in order to achieve desired results.

Although only some examples and implementations are disclosed in the above embodiments of the application, based on the disclosed contents, modifications, adjustments, and improvements.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. An ultrasonic transceiver device, comprising:

a plurality of coupled ultrasonic transceiver units, wherein, each of the ultrasonic transceiver units comprises:

a plurality of ultrasonic oscillators;

a driving bias circuit coupled to the ultrasonic oscillators and used to selectively output an alternating current (AC) voltage and a direct current (DC) voltage to the ultrasonic oscillators; and a switching circuit coupled to the driving bias circuit, wherein the switching circuit has a plurality of switching paths corresponding to a plurality of impedance values or a plurality of inductance values, and the switching circuit is used to switch a system driving signal to pass through one of the switching paths according to a mode selection signal and transmitted to the driving bias circuit;

wherein, in each of the ultrasonic transceiver units, the switching circuit comprises a plurality of multiplexers and a plurality of inductors; the multiplexers are controlled by the mode selection signal to perform switching, and the inductors have different inductance values.

2. The ultrasonic transceiver device according to claim 1, wherein, the ultrasonic transceiver units are connected in parallel or series.

3. The ultrasonic transceiver device according to claim 1, wherein, in each of the ultrasonic transceiver units, the ultrasonic oscillators are connected in series.

4. The ultrasonic transceiver device according to claim 1, wherein, in each of the ultrasonic transceiver units, the driving bias circuit comprises a capacitor and a resistor; the capacitor is coupled between the switching circuit and the ultrasonic oscillators, and the resistor is coupled between a direct current (DC) voltage source and the ultrasonic oscillators.

5. The ultrasonic transceiver device according to claim 1, wherein, in each of the ultrasonic transceiver units, when operating in a first mode, the mode selection signal controls the multiplexers, and the system driving signal passes through a first switching path of the switching paths and is transmitted to the driving bias circuit.

6. The ultrasonic transceiver device according to claim 1, wherein, in each of the ultrasonic transceiver units, when operating in a second mode, the mode selection signal controls the multiplexers, and the system driving signal passes through a second switching path of the switching paths and is transmitted to the driving bias circuit.

7. An ultrasonic transceiver device controlling method used to control the ultrasonic transceiver device according to claim 1, wherein the control method comprises:

during emission of ultrasonic waves, emitting the mode selection signal to transmit the system driving signal to the driving bias circuit through one of the switching paths, and the driving bias circuit drives the ultrasonic oscillators to emit ultrasonic waves.

8. The ultrasonic transceiver device controlling method according to claim 7, wherein, the ultrasonic transceiver units are connected in parallel.

9. The ultrasonic transceiver device controlling method according to claim 7, wherein, in each of the ultrasonic transceiver units, the ultrasonic oscillators are connected in series.

10. The ultrasonic transceiver device controlling method according to claim 7, wherein, in each of the ultrasonic transceiver units, the driving bias circuit comprises a capacitor and a resistor; the capacitor is coupled between the switching circuit and the ultrasonic oscillators, and the resistor is coupled between a direct current (DC) voltage source and the ultrasonic oscillators.

11. The ultrasonic transceiver device controlling method according to claim 7, wherein, in each of the ultrasonic transceiver units, when operating in a first mode, the mode selection signal controls the multiplexers, and system driving signal passes through a first switching path of the switching paths and is transmitted to the driving bias circuit.

12. The ultrasonic transceiver device controlling method according to claim 7, wherein, in each of the ultrasonic transceiver units, when operating in a second mode, the mode selection signal controls the multiplexers, and the system driving signal passes through a second switching path of the switching paths and is transmitted to the driving bias circuit.

13. An ultrasonic transceiver device, comprising:

a plurality of coupled ultrasonic transceiver units, wherein, each of the ultrasonic transceiver units comprises:

a plurality of ultrasonic oscillators;

a driving bias circuit coupled to the ultrasonic oscillators and used to receive an alternating current (AC) voltage; and a switching circuit coupled to the driving bias circuit, wherein the switching circuit has a plurality of switching paths corresponding to a plurality of impedance values or a plurality of inductance values; the switching circuit is used to switch a system driving signal to pass through one of the switching paths according to a mode selection signal and transmitted to the driving bias circuit as the AC voltage;

wherein, in each of the ultrasonic transceiver units, the switching circuit comprises a plurality of multiplexers and a plurality of inductor; the multiplexers are controlled by the mode selection signal to perform switching, and the inductors have different inductance values.

14. The ultrasonic transceiver device according to claim 13, wherein, the ultrasonic transceiver units are connected in parallel or series; and in each of the ultrasonic transceiver units, the ultrasonic oscillators are connected in series.

15. The ultrasonic transceiver device according to claim 13, wherein, in each of the ultrasonic transceiver units, the driving bias circuit comprises a capacitor and a resistor; the capacitor is coupled between the switching circuit and the ultrasonic oscillators, and the resistor is coupled between a direct current (DC) voltage source and the ultrasonic oscillators.

16. The ultrasonic transceiver device according to claim 13, wherein, in each of the ultrasonic transceiver units, when operating in a first mode, the mode selection signal controls the multiplexers, and the system driving signal passes through a first switching path of the switching paths and is transmitted to the driving bias circuit.

17. The ultrasonic transceiver device according to claim 13, wherein, in each of the ultrasonic transceiver units, when operating in a second mode, the mode selection signal controls the multiplexers, and the system driving signal passes through a second switching path of the switching paths and is transmitted to the driving bias circuit.

* * * * *